United States Patent Office 3,529,226
Patented Sept. 15, 1970

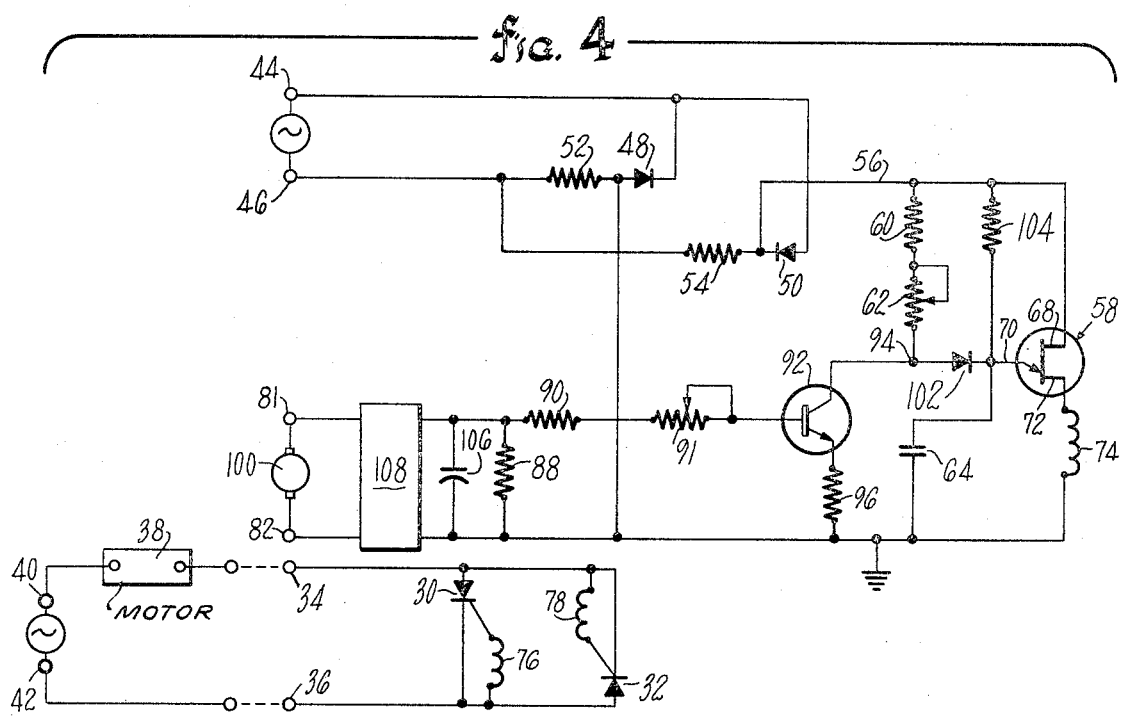

3,529,226
TACHOMETER SPEED CONTROL FOR A LINEAR INDUCTION MOTOR
Robert E. Correll, Middlebury, and Francis Norman Wroble, Wethersfield, Conn., assignor to Skinner Precision Industries, Inc., New Britain, Conn., a corporation of Connecticut
Filed Dec. 19, 1966, Ser. No. 602,801
Int. Cl. H02p 5/34
U.S. Cl. 318—341            12 Claims

ABSTRACT OF THE DISCLOSURE

Disclosed is a linear induction motor speed control using a tachometer to sense the motor speed and a controlled rectifier to regulate the power applied to the linear motor. The controlled rectifiers are triggered during each half cycle of the AC power source so that a pulse of power is delivered to the motor regardless of the motor speed to ensure smooth operation.

---

This invention relates generally to a speed control for linear induction motors and more particularly to an improved tachometer-driven semiconductor speed control for an induction-type linear actuator.

The improved speed control is an improvement of the eddy-current type speed sensor and control disclosed and claimed in the pending U.S. patent application Ser. No. 454,773, filed May 7, 1965, and assigned to the assignee of the present application.

A general object of the invention is to provide an induction-type linear actuator with a rotary tachometer whose electrical output controls the AC power applied to the actuator so that the linear armature conductor of the actuator does not exceed a predetermined steady state speed.

An additional object is to provide an improved linear actuator speed control in which the speed signal from a tachometer is utilized to control the firing angle of semiconductor controlled rectifiers connected in the AC power input circuit of the actuator.

Another object is to provide semiconductor speed control circuits which may be driven by either an AC or a DC tachometer to control the speed of an induction-type linear actuator.

Other objects will be in part obvious and in part pointed out more in detail hereinafter.

The invention accordingly consists in the features of construction, combination of elements and arrangements of parts which will be exemplified in the construction hereafter set forth and the scope of the application which will be indicated in the appended claims.

In the drawings:

FIG. 4 is a schematic diagram of the improved semiconductor speed control circuit designed to be driven by a DC tachometer.

Figure 1A:
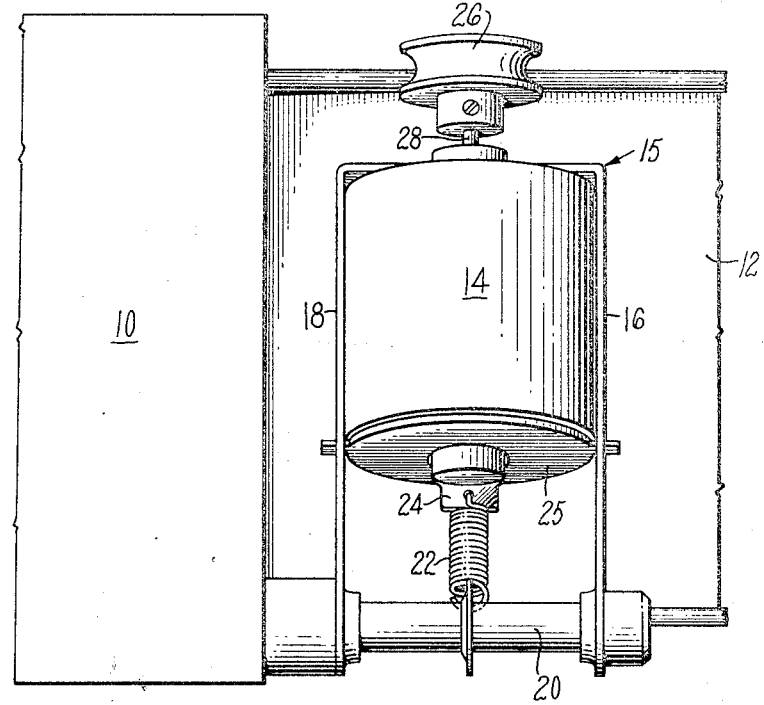
FIG. 1A is a plan view of the improved tachometer speed sensor shown mounted to a linear actuator.
Figure 1B:
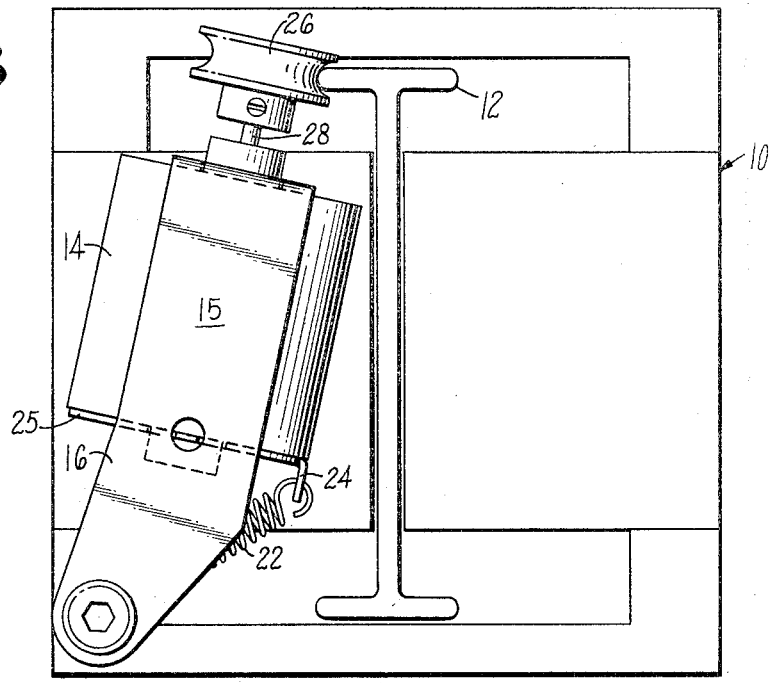
FIG. 1B is a side view of FIG. 1A.

FIGS. 1A and 1B illustrate the manner in which the tachometer is oriented with respect to a linear induction motor actuator 10 and a sliding door support 12 which acts as the linear armature for the motor. A tachometer is mounted inside housing 14 which is fixed in a U-shaped bracket 15 having legs 16 and 18 which in turn are pivotally mounted on a supporting rod 20 which is secured to the induction motor housing 10. A spring 22 is connected between rod 20 and a projection 24 on a locking plate 25 to bias the tachometer drive roller 26 into engagement with the top flange of the support 12. This arrangement eliminates the possibility of slippage between the roller 26 and the support 12 to insure that an accurate speed signal is generated by the tachometer. The roller 26 is fixed to a shaft 28 which in turn is fixed to the rotor of the tachometer contained within housing 14.

Figure 2:
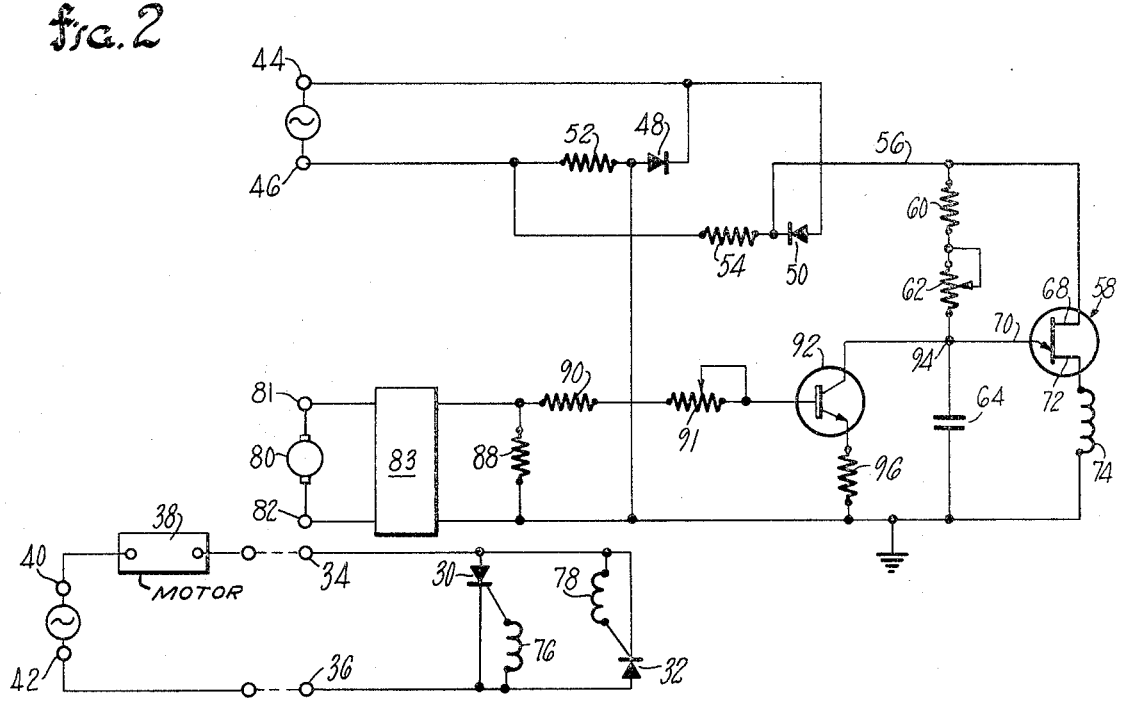
FIG. 2 is a schematic diagram of the improved semiconductor speed control which is designed to be driven by an AC tachometer signal.

FIG. 2 is a schematic diagram of the linear induction motor speed control adapted to be driven from an AC tachometer. A pair of silicon controlled rectifiers 30 and 32 are reversely connected in parallel across terminals 34 and 36. A linear induction motor 38 is adapted to be connected between one terminal 40 of a 110 volt 60 cycle AC power source and terminal 34. Terminal 36 is adapted to be connected to the other terminal 42 of the AC source.

Terminals 44 and 46 are also adapted to be connected to the AC power source and are also connected to a full wave rectifier including semiconductor diodes 48 and 50 and resistors 52 and 54. The output of the rectifier is connected to a conductor 56 which is connected to a timing circuit comprising a unijunction transistor 58, a fixed resistor 60, an adjustable resistor 62 and a timing capacitor 64. The unijunction transistor 58 includes an upper base 68, an emitter 70 and a lower base 72. The primary winding 74 of a pulse transformer is connected in series with the emitter-lower base circuit of the unijunction transistor 58. One secondary winding 76 of the pulse transformer is connected to the gate of SCR 30, and another secondary winding 78 is connected to the gate of SCR 32. Winding 76 is wound in the same direction as primary winding 74, but winding 78 is wound in the opposite direction.

A tachometer generator 80 which is driven by the linear armature conductor of the linear induction motor is connected across terminals 81 and 82 which are in turn connected to the input of a full wave bridge rectifier 83. Connected across the output of the rectifier 83 is a resistor 88. A fixed resistor 90 and an adjustable resistor or potentiometer 91 are connected in series between the output of rectifier 83 and the base of an NPN transistor 92. The collector of transistor 92 is connected to the junction 94 of capacitor 64 and emitter 70 of the unijunction transistor. An emitter resistor 96 connects the emitter of transistor 92 to ground.

The circuit operates in the following manner. The AC speed signal produced by tachometer 80 is rectified by the bridge rectifier 83 and applied as a control signal to the base of transistor 92. When there is no signal from tachometer 80, the transistor 92 is non-conducting. The charging time of capacitor 64 is then dependent only upon the setting of the adjustable resistor 62 and the full wave voltage from the rectifier diodes 48 and 50. Consequently, capacitor 64 will charge relatively quickly at the beginning of each half cycle to the breakdown voltage of unijunction transistor 58 and cause the capacitor to discharge through the emitter-lower base path of the transistor to produce in winding 74 a pulse which is coupled to winding 76 and winding 78. Because of the manner in which windings 76 and 78 are wound, a positive pulse will be applied to winding 76 for every positive half cycle of the AC source to cause SCR 30 to conduct and send a substantially complete half wave of current through motor 38. On the following half cycle of AC, capacitor 64 will again charge very quickly and discharge through unijunction transistor 58 to produce a positive pulse in winding 78 so that SCR 32 conducts the next half cycle of AC through the motor 38. Each half cycle of AC will turn off the SCR which was conducting on the immediately preceding half cycle.

Figure 3A:
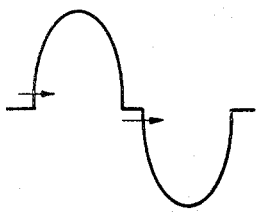
FIGS. 3A, 3B and 3C illustrate three of the linear actuator input current waveforms which may be produced by means of the improved speed control driven by the output of a tachometer.

The wave form in FIG. 3A represents the current through motor 38 when there is zero tachometer signal and therefore maximum AC power applied to the motor.

Figure 3B:
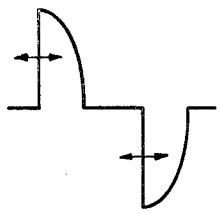

FIG. 3B shows the wave form of the current through motor 38 when a moderate speed signal is produced by the tachometer 80. Any signal produced by tachometer 80 is a full wave rectified to provide a positive signal to the base of transistor 92 and thereby render the transistor conducting. The amount of current flowing through the transistor depends upon the magnitude of the signal applied to its base. When transistor 92 becomes conducting, it shunts some of the charging current from timing capacitor 64 and thereby increases the time constant of the timing circuit so unijunction transistor 58 breaks down later in each half cycle. Consequently, the firing angle of the SCR is retarded so that less than full power is applied to the motor, thereby slowing down the motor.

Wave form 3C represents the current flowing through motor 38 when there is a very large signal in the output of tachometer 80. Here the firing angle is retarded to such a point that the motor is operated at a very low speed torque. Of course, in the extreme case as where there is the absence of friction in moving door support 12 relative to stator 10, the tachometer generator signal would be large enough to prevent capacitor 64 from charging to the unijunction breakdown voltage at any time during each half cycle thereby completely deenergizing the motor 38.

However, when the power applied to the motor is reduced because of the action of the speed control circuit, the friction forces acting on the armature, e.g. door support 12 in FIG. 1B, will slow down the motor. In such a closed loop system, variations of line voltages, coil temperature of the motor stator, and load variations will not adversely affect the armature's speed since the power applied to the motor is controlled predominantly by the speed signal from the tachometer generator and varies inversely with speed of the armature.

The predetermined constant or steady state speed of the armature is determined by the setting of gain potentiometer 91 which controls the amount of tachometer signal current fed to the base of transistor. The potentiometer 62 may be adjusted to set the time constant of the timing circuit to a point to assure firing of the unijunction transistor at the beginning of each half cycle of AC when there is zero tachometer signal.

Figure 3C:
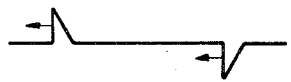

FIG. 4 is similar to FIG. 2 but illustrates a speed control circuit which has been modified to be driven by a DC tachometer 100 instead of the AC tachometer 80. Due to non-linearities of the synchronized full wave signal applied to the unijunction transistor circuit, the circuit of FIG. 4 has been modified to include the diode 102 and a resistor 104. As shown in FIG. 4, the resistor 104 is placed in parallel circuit relationship with the resistors 60 and 62 to determine the charging rate for the timing capacitor 64 and the firing of unijunction transistor 58. The blocking diode 102 prevents the transistor 92 from shunting the current through resistor 104 to establish the maximum delay in the build-up of voltage in timing capacitor 64 to a level sufficient to fire unijunction transistor 64 during each half cycle of power (FIG. 3C) under all levels of output from tachometer 100 and regardless of the low impedance offered by the transistor 92 relative to the capacitor 64. Continuous control is difficult without these additional elements and furthermore, excessive amount of mechanical noise occurred. The extra components reduced the power applied to motor 38, but they prevent the SCR's from turning off completely, and therefore smoother action is obtained. A smoothing capacitor 106 is also connected to the output of the full wave bridge rectifier 108. Aside from these features, the FIG. 4 circuit operates identically to that of FIG. 2.

As will be apparent to persons skilled in the art, various modifications and adaptations of the structure described above will become readily apparent without departure from the spirit and scope of the invention, the scope of which is defined in the appended claims.

We claim:
1. A speed control for a linear induction motor adapted to be energized from an AC power source and having a stator and a relatively movable linear armature conductor comprising:
   (a) a signal generator mounted on said stator,
   (b) means driving said generator in accordance with the speed of said linear armature conductor relative to said stator to produce a speed signal,
   (c) controlled rectifier means connected in circuit with said stator and said power source,
   (d) means coupling said speed signal to said controlled rectifier means to control the firing angle thereof relative to said AC source to automatically control the power applied to said motor inversely with said speed signal, and
   (e) means connected to deliver a triggering pulse to said controlled rectifier means during each half cycle of the AC power source whereby a pulse of power is delivered to said motor during each half cycle of the AC power source regardless of the speed of movement of said armature relative to said stator.

2. A speed control for a linear induction motor as defined in claim 1 wherein said generator produces an AC speed signal.

3. A speed control for a linear induction motor as defined in claim 1 wherein said generator produces a DC speed signal.

4. A speed control for a linear induction motor as defined in claim 1 wherein said controlled rectifier means comprises:
   (a) a pair of semiconductor controlled rectifiers reversely connected in parallel with each other and adapted to be connected in series with said stator and said source, each semiconductor controlled rectifier having a gate,
   (b) an adjustable timing circuit responsive to said speed signal and coupled to said gates to vary the firing angles of said controlled rectifiers in synchronism with said AC source.

5. A speed control for a linear induction motor as defined in claim 4 wherein said timing circuit includes means to limit the maximum delay of the firing angles of said controlled rectifiers to insure the delivery of at least a pulse of power from said controlled rectifiers to the stator during each half cycle of power from the AC power source.

6. A speed control for a linear induction motor as defined in claim 5 further comprising:
   (a) a variable impedance means responsive to said speed signal, and
   (b) means connecting said variable impedance means between said generator and said timing circuit.

7. A speed control for a linear induction motor as defined in claim 6 wherein said variable impedance means comprises a control transistor whose degree of conduction is dependent upon the magnitude of said speed signal.

8. A speed control for a linear induction motor as defined in claim 7 further comprising means for manually adjusting the magnitude of the speed signal applied to said control transistor.

9. A speed control for a linear induction motor as defined in claim 7 wherein said timing circuit comprises:
   (a) a unijunction transistor having an upper base, an emitter, and a lower base,
   (b) a timing capacitor connected to said emitter, and
   (c) means connecting said control transistor in shunt with said capacitor so that the charging rate of said capacitor varies inversely with the degree of conduction of said control transistor.

10. A speed control for a linear induction motor as defined in claim 9:
including a resistor in series with said timing capacitor and a blocking diode isolating said series resistor from said control transistor to provide a minimum charging rate for said capacitor.

11. A speed control for a linear induction motor as defined in claim 1 wherein said generator comprises a rotary tachometer mounted on said stator and is provided with a drive roller frictionally engaging said linear armature conductor to drive the tachometer.

12. A speed control for a linear induction motor as defined in claim 11 wherein the drive roller is spring biased into engagement with said armature conductor.

References Cited

UNITED STATES PATENTS

| | | | |
|---|---|---|---|
| 3,183,337 | 5/1965 | Chin | 318—341 |
| 3,189,811 | 6/1965 | King | 318—327 |
| 3,222,582 | 12/1965 | Heyman | 318—341 |
| 3,249,839 | 5/1966 | Fay | 318—345 |
| 3,355,643 | 11/1967 | Benson | 318—341 |
| 3,389,325 | 6/1968 | Gilbert | 318—345 |

OTHER REFERENCES

General Electric Silicon Controlled Rectifier Manual, Auburn, N.Y., 1964, pp. 125–152.

ORIS L. RADER, Primary Examiner

A. G. COLLINS, Assistant Examiner

U.S. Cl. X.R.

318—328, 345